US012612011B2

(12) United States Patent　(10) Patent No.: US 12,612,011 B2
Salter et al.　(45) Date of Patent: Apr. 28, 2026

(54) MULTIPLE FREQUENCY BAND COMMUNICATION SYSTEM FOR VEHICLE

(71) Applicant: FORD GLOBAL TECHNOLOGIES, LLC, Dearborn, MI (US)

(72) Inventors: Stuart C. Salter, White Lake, MI (US); Douglas Whiteman Smith, Farmington Hills, MI (US); John Robert Van Wiemeersch, Novi, MI (US); Brendan F. Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 18/243,878

(22) Filed: Sep. 8, 2023

(65) Prior Publication Data

US 2025/0083638 A1　Mar. 13, 2025

(51) Int. Cl.
| *B60R 25/102* | (2013.01) |
| *B60Q 1/50* | (2006.01) |
| *B60R 25/01* | (2013.01) |
| *B60R 25/104* | (2013.01) |
| *B60R 25/30* | (2013.01) |
| *B60W 60/00* | (2020.01) |
| *G07C 5/00* | (2006.01) |

(52) U.S. Cl.
CPC ............ *B60R 25/102* (2013.01); *B60Q 1/509* (2022.05); *B60R 25/01* (2013.01); *B60R 25/104* (2013.01); *B60R 25/305* (2013.01); *B60W 60/0025* (2020.02); *G07C 5/008* (2013.01); *B60W 2556/45* (2020.02)

(58) Field of Classification Search
CPC ..... B60R 25/102; B60R 25/01; B60R 25/104; B60R 25/305; B60W 60/0025; B60W 2556/45; B60Q 1/509; G07C 5/008
See application file for complete search history.

(56) References Cited

U.S. PATENT DOCUMENTS

| 7,355,506 B2 | 4/2008 | Chandley | |
| 7,561,102 B2 | 7/2009 | Duvall | |
| 7,961,095 B2 | 6/2011 | George et al. | |
| 8,587,435 B2 | 11/2013 | Nguyen et al. | |
| 9,227,595 B2 | 1/2016 | Yang et al. | |
| 2007/0015548 A1 | 1/2007 | Flick | |
| 2015/0116100 A1* | 4/2015 | Yang ......................... | G07C 9/29 |
| | | | 340/426.3 |
| 2019/0279447 A1* | 9/2019 | Ricci ...................... | B60R 25/01 |

(Continued)

OTHER PUBLICATIONS

English Translation of DE 102018002944 A1 Title: Method For Operating A Vehicle Author: Kutschke et al. Date: Oct. 11, 2018 (Year: 2018).*

(Continued)

*Primary Examiner* — Steven Vu Nguyen
(74) *Attorney, Agent, or Firm* — Joseph Zane; Brooks Kushman P.C.

(57) ABSTRACT

A vehicle includes a transceiver configured to support multiple frequency bands; a display; and a controller programmed to, responsive to detecting the vehicle is stolen, generate a message including a location of the vehicle, transmit the message to one or more external devices via the transceiver using the multiple frequency bands; generate a first notice; and output the first notice via the display.

17 Claims, 3 Drawing Sheets

202 — Detect vehicle stolen, ask for confirmation

204 — Confirmation received? — Yes — 206 End

No

208 — Activate vehicle sensors

210 — Communicate with external devices via multiple frequency bands

212 — Output message based on location

214 — Operate vehicle body features

216 — Autonomously operate vehicle driving

200

(56) References Cited

U.S. PATENT DOCUMENTS

| | | | | | |
|---|---|---|---|---|---|
| 2019/0344755 | A1* | 11/2019 | Müller | ................ | B60R 25/2018 |
| 2022/0191683 | A1* | 6/2022 | Shah | ....................... | G10L 15/22 |

OTHER PUBLICATIONS

English Translation of KR20140069608A Title: System and Method for Controlling Vehicle's Entry and Engine Start Author: Lee et al. Date: Jun. 10, 2014 (Year: 2014).*
English Translation of JP2015076017A Title: Communication System Author: Usami et al. Date: Apr. 20, 2015 (Year: 2015).*

* cited by examiner

100

202 — Detect vehicle stolen, ask for confirmation

204 — Confirmation received?

Yes → End 206

No

208 — Activate vehicle sensors

210 — Communicate with external devices via multiple frequency bands

212 — Output message based on location

214 — Operate vehicle body features

216 — Autonomously operate vehicle driving

200

MULTIPLE FREQUENCY BAND COMMUNICATION SYSTEM FOR VEHICLE

TECHNICAL FIELD

The present disclosure generally relates to a communication system for a vehicle. More specifically, the present disclosure relates to a multiple frequency band communication system to detect and operate vehicles that are reported stolen.

BACKGROUND

Modern vehicles may be provided with stolen vehicle services configured to send vehicle information (e.g. vehicle location) to a designated entity via a predefined communication channel (e.g. a cellular network). However, sophisticated thieves may compromise the stolen vehicle service by disabling vehicle hardware such as a modem and/or other transceivers, or placing a signal jammer at the vicinity of the vehicle to jam wireless communications at a certain frequency.

SUMMARY

In one or more illustrative examples of the present disclosure, a vehicle includes a transceiver configured to support multiple frequency bands; a display; and a controller programmed to, responsive to detecting the vehicle is stolen, generate a message including a location of the vehicle, transmit the message to one or more external devices via the transceiver using the multiple frequency bands; generate a first notice; and output the first notice via the display.

In one or more illustrative examples of the present disclosure, a method for a vehicle includes responsive to detecting a vehicle is being operated by an unauthorized user, generating, via one or more controllers, a message including a vehicle identification; transmitting, via one or more transceivers, the message to one or more external devices via a plurality of wireless frequency bands; generating, via the one or more controllers, a first notice; and outputting, via a display, the first notice by ignoring a user input intended to turn off the display.

In one or more illustrative examples of the present disclosure, a non-transitory computer-readable medium, includes instructions, when executed by one or more controllers of a vehicle, cause the vehicle to: responsive to detecting a vehicle is stolen, capture an image of a vehicle user; generate a message including a vehicle identification, a vehicle location; and the image; transmit the message to one or more external devices via multiple frequency bands; generate a first notice based on the vehicle location; output the first notice via an interior display; generate a second notice different from the first notice; and output the second notice via an exterior display.

BRIEF DESCRIPTION OF THE DRAWINGS

For a better understanding of the invention and to show how it may be performed, embodiments thereof will now be described, by way of non-limiting examples only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a system for operating a vehicle responsive to detecting the vehicle is stolen. More specifically, the present disclosure proposes a system for performing wireless communication with a third-party entity using multiple frequency bands responsive to detecting the vehicle is stolen.

Figure 1:
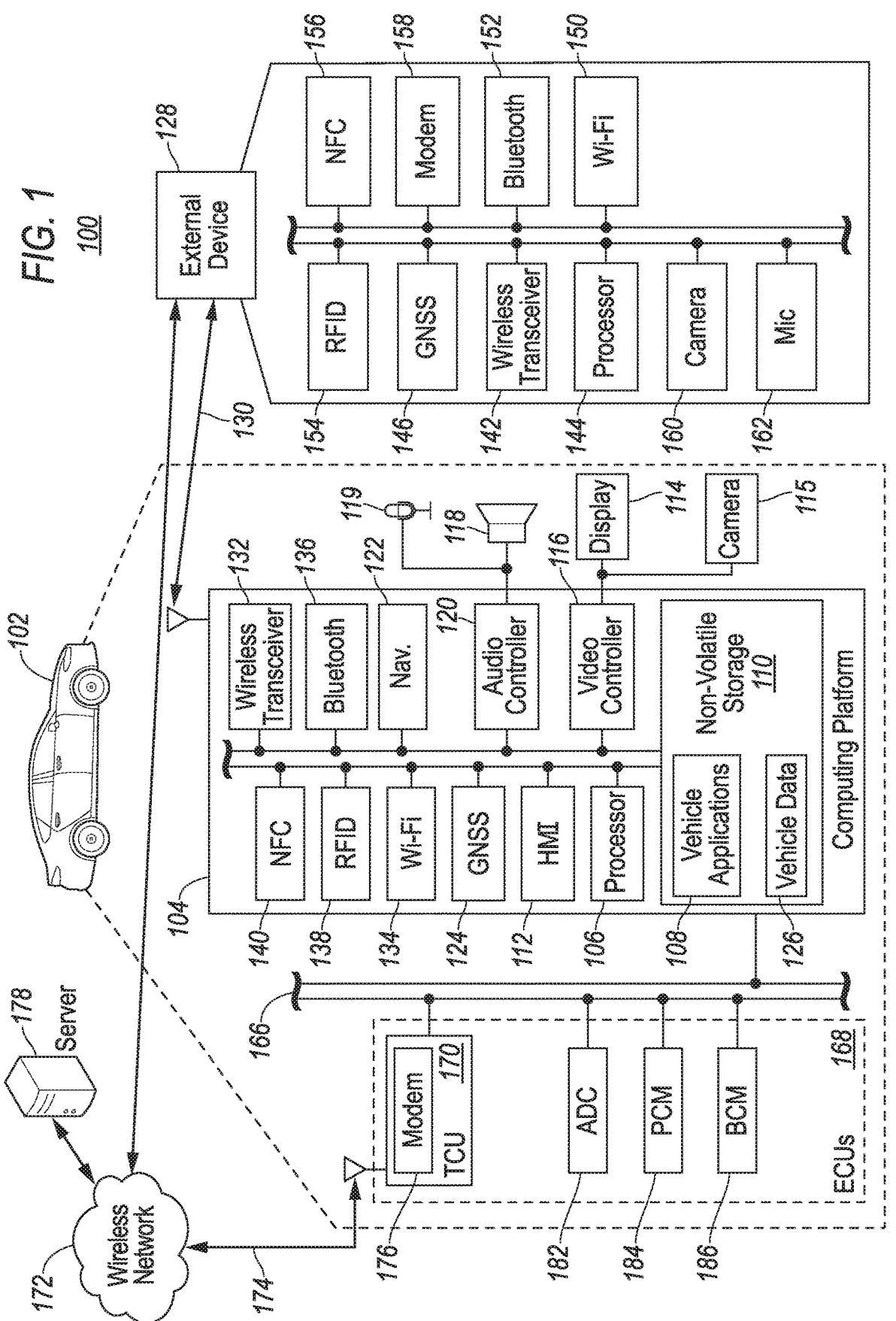
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), bus/coach, motorcycle, boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), a parallel/series hybrid vehicle (PSHEV), or a fuel-cell electric vehicle (FCEV). It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, remote controls, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The computing platform 104 may be provided with various features allowing the vehicle users to interface with the computing platform 104. For example, the computing platform 104 may receive input from human machine interface (HMI) controls 112 configured to provide for user interaction with the vehicle 102. As an example, the computing platform 104 may interface with one or more buttons, switches, knobs, or other HMI controls configured to invoke functions on the computing platform 104 (e.g., steering wheel audio buttons, a push-to-talk button, instrument panel controls, or the like).

The computing platform 104 may also drive or otherwise communicate with one or more displays 114 configured to provide visual output to vehicle users by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more cameras 115 configured to provide video input by way of a video controller 116. In some cases, the cameras may include one of more cabin cameras located within the vehicle cabin and configured to capture images of vehicle users (e.g. facial images). Additionally, or alternatively, the cameras may include one or more exterior cameras configured to capture images of the vicinity of the vehicle. For instance, the exterior cameras may include a backup camera and/or 360-degree surrounding view cameras. The computing platform 104 may also drive or otherwise communicate with one or more speakers 118 configured to provide audio output to vehicle users by way of an audio controller 120. The computing platform 104 may also drive or otherwise communicate with one or more microphones 119 configured to provide audio input to the computing platform 104 by way of the audio controller 120. For instance, the microphone 119 may be used to capture a voice of one or more vehicle users. Additionally, the computing platform 104 may be also provided with capabilities to integrate video and audio from other associated devices such as a user's camera, smartphone or the like.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) or the like. Map data used for route planning may be stored in the storage 110 as a part of the vehicle data 126. Map data may also be stored or periodically updated from the cloud via TCU 170. Navigation software may be stored in the storage 110 as one the vehicle applications 108.

The vehicle 102 may provide wireless communication capabilities to accommodate various situations. For instance, the computing platform 104 may be configured to wirelessly communicate with an external device 128 via a wireless connection 130. The external device 128 may include one or more devices associated with various entities such as the vehicle owner, dealership, manufacturer, a law enforcement entity, a third-party entity or the like. In case that the vehicle 102 is stolen, the external device 128 may be configured to facilitate the identification and location of the vehicle 102 in a crowd sourcing manner. The external device 128 may include various types of portable devices such as mobile license plate readers (LPRs), vehicles, cellular phones, tablet computers or the like. Additionally, the external device 128 may include various types of stationary devices such as a stationary LPR, traffic signal devices, highway or street or building cameras, vehicle fueling facility (e.g. charging station), parking meters or the like. The computing platform 104 may be provided with a wireless transceiver 132 in communication with a Wi-Fi controller 134, a BLUETOOTH controller 136, a radio-frequency identification (RFID) controller 138, a near-field communication (NFC) controller 140, and other controllers such as a Zigbee transceiver, an Infrared Data Association (IrDA) transceiver, an Ultra-Wideband (UWB) transceiver (not shown) and configured to communicate with a compatible wireless transceiver 142 of the external device 128.

Depending on the specific implementations, the external device 128 may be provided with various hardware and software configurations. In one example, the external device 128 may be provided with a processor 144 configured to perform instructions, commands, and other routines in support of the processes such as wireless communication, and multi-media data processing (e.g. video, and audio processing). For instance, the external device 128 may be provided with location and navigation functions via a GNSS controller 146. The external device 128 may be provided with a wireless transceiver 142 in communication with a Wi-Fi controller 150, a BLUETOOTH controller 152, a RFID controller 154, an NFC controller 156, and other controllers (not shown), configured to communicate with the wireless transceiver 132 of the computing platform 104 via compatible communication protocols. The external device 128 may be further provided with a modem 158 configured to communicate with a wireless wide area network. The external device 128 may be further provided with a camera 160 and a microphone 162 configured to capture video and audio input respectively.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via BLUETOOTH low-energy (BLE), Wi-Fi, UWB, or the like.

The computing platform 104 may be configured to communicate with various electronic control units (ECUs) 168 of the vehicle 102 configured to perform various operations.

For instance, the computing platform 104 may be configured to communicate with a telematics control unit (TCU) 170 configured to control telecommunication between vehicle 102 and a wireless network 172 through a wireless connection 174 using a modem 176. The wireless connection 174 may be in the form of various communication network e.g., a wireless wide-area network (a.k.a. cellular network). Through the wireless network 172, the vehicle 102 may access one or more servers 178 to access various content for various purposes. It is noted that the terms wireless network 172 and server are used as general terms in the present disclosure and may include any computing network involving carriers, router, computers, controllers, circuitries or the like configured to store data and perform data processing functions and facilitate communication between various entities.

The ECUs 168 may further include an autonomous driving controller (ADC) 182 configured to control autonomous driving features of the vehicle 102. Driving instructions may be received remotely from the server 178. The ADC 182 may be configured to perform the autonomous driving features using the driving instructions combined with navigation instructions from the navigation controller 122.

The ECUs 168 may further include a powertrain control module (PCM) 184 configured to control the powertrain of the vehicle 102. For instance, the PCM 184 may be configured to limit vehicle speed or inhibit the vehicle from being driven in certain conditions.

The ECUs 168 may further include a body control module (BCM) 186 configured to control body operations of the vehicle. For instance, the BCM 186 may be configured to control the vehicle interior and exterior lighting. The BCM 186 may be further configured to lock and unlock vehicle doors, trunk, and frunk.

The vehicle 102 may be provided with various features including a stolen vehicle service configured to detect and resolve situations when the vehicle 102 is stolen by an unauthorized user. The vehicle 102 may be configured to automatically detect that the vehicle 102 is stolen and being driven by an unauthorized user. As discussed above, the vehicle 102 may be provided with wireless communication capabilities to communicate with various entities. One or more vehicle components or controllers may be configured to detect and identify the stolen vehicle status using the communication status. It is noted that the one or more vehicle components or controllers may be configured to differentiate the stolen vehicle status from a communication malfunction which may happen sometimes. For instance, the vehicle 102 may communicate with the server 178 using certain hardware to report stolen vehicle information such as locations. With that knowledge, car thieves may commonly disable that hardware or jam wireless bands used for stolen vehicle reporting, while leaving other wireless communication bands and hardware intact as the vehicles are being stolen. If the vehicle 102 detects those hardware elements and/or communication bands ceased to function, while other hardware and/or communication bands, are still working, as opposed to other hardware and/or communication bands also stopping to function, a differentiation may be drawn by the vehicle controllers to determine a stolen status rather than communication malfunction.

Once the vehicle 102 is determined to be stolen, the vehicle 102 may communicate with the server 178 in a stealth manner without having the car thieves noticing. As discussed above, certain wireless frequency bands commonly used to communicate with the server 178 may be compromised. However, unbeknown by the thieves, the vehicle 102 may be configured to communicate with various entities including the server 178 using wireless frequency bands that are not commonly used to reporting stolen vehicles.

Figure 2:
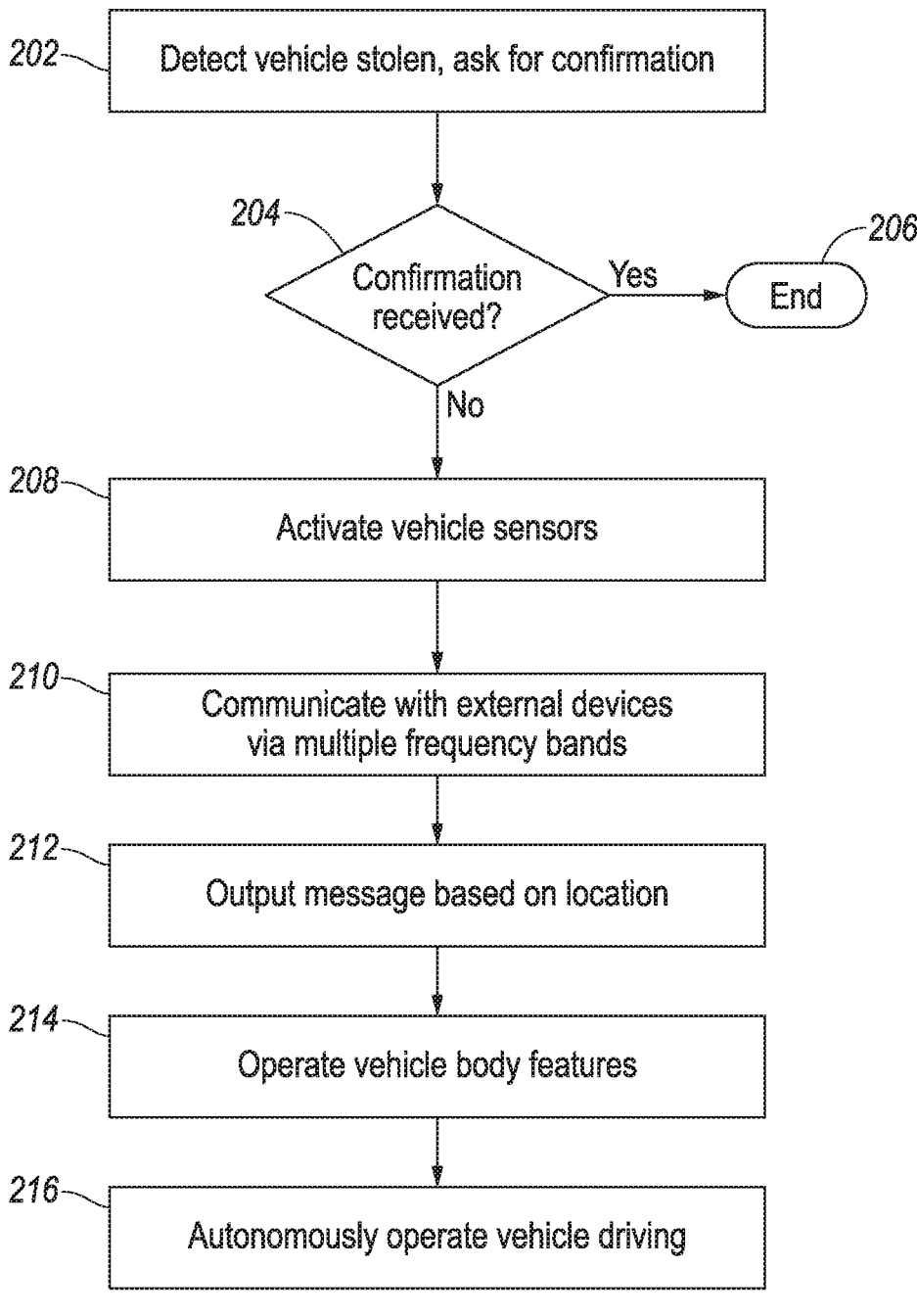
FIG. 2 illustrates an example flow diagram of a process for operating the vehicle upon detecting the vehicle is stolen.

Referring to FIG. 2, an example flow diagram of a process 200 for operating the vehicle 102 responsive to detecting the vehicle 102 is stolen is illustrated. With continuing reference to FIG. 1, the process 200 may be individually or collectively implemented by one or more components of the computing platform 104 and/or ECUs 168.

At operation 202, responsive to detecting the vehicle 102 is possibly stolen, the computing platform 104 outputs a message and asks for a user input to prevent a false alarm. There are many ways for the vehicle 102 to detect a stolen status. For instance, responsive to detecting a predefined abnormality such as driving out of a geofence, the server 178 associated with the manufacturer or dealership may send the vehicle 102 a wireless message indicative of a possible stolen alarm and ask the vehicle user to input a predefined passcode (e.g. set by the manufacturer, admin, or owner) via the HMI controls 112 to confirm the user's operation of the vehicle 102 is authorized. Additionally, or alternatively, sophisticated thieves may compromise the vehicle communication system by damaging communication hardware (e.g. modem, antennas) or placing a signal jammer at the vicinity of the vehicle 102 such that the vehicle 102 is unable to communicate with the server using the wireless network 172. To address these situations, the vehicle 102 may be configured to periodically receiving a verification signal from the server 178 at a predefined interval (e.g. every a few hours) and automatically detect the possible stolen status responsive to not receiving the stolen status signal. Additionally, or alternatively, the vehicle 102 may be configured to automatically detect the possible stolen status using the geofence configuration without requiring communication with the server 178. As an example, vehicle manufacturers and dealerships may impose one or more geofences to the navigation system of each undelivered/unsold vehicle. Responsive to detecting the vehicle location being out of the geofence, the vehicle 102 may automatically trigger the possible stolen status check and communicate with the server 178 for confirmation. Additionally, or alternatively, the vehicle 102 may be configured to automatically detect the possible stolen status via the communication status of various communication bands. As discussed above, car thieves may compromise the operation of one or more wireless frequency bands. However, it is unlikely that the thief would be able to compromise all of the multiple frequency bands supported by the vehicle 102 in a short period of time when stealing the vehicle 102. In this regard, if the vehicle 102 detects some frequency bands no longer operate, indicative of a possible compromise, while other frequency bands are still operating, a possible stolen status may be flagged. Additionally, or alternatively, the vehicle 102 may be configured to detect the possible stolen status in response to being unable to connect to a cellular network at a location that is known to be covered by the cellular network based on map data. Additionally, or alternatively, the hardware of the vehicle 102 may be provided with tamper protections and responsive to detecting the relevant hardware (e.g., antenna, TCU) has been tampered with by someone, a possible stolen status may be flagged.

At operation 204, the computing platform 104 verifies if the confirmation is received within a predefined period of time (e.g. one minute). As discussed above, the confirmation may be received locally by a user inputting the passcode via the HMI control 112 and/or remotely from the server 178. If the confirmation is received within the predefined period indicative of the possible stolen status detection being a false alarm, the process proceeds to operation 206 and ends.

Otherwise, if the answer for operation 204 is no and the computing platform 104 does not receive the confirmation within the predefined period of time, the process proceeds to operation 208 and the stolen vehicle service is activated. The stolen vehicle service may include various operations aimed to mitigate and resolve the situation. For instance, at operation 208, the computing platform 104 activates vehicle sensors such as the cabin camera 115 to capture images and videos of the vehicle user. Additionally, or alternatively, one or more exterior cameras 115 may be activated to capture images and videos of the surrounding environment of the vehicle 102. The computing platform 104 may further activate the microphone 119, where allowed by law, to record any voice uttered by the user. In the case that the vehicle 102 is provided biometric sensors such as a fingerprint reader, the computing platform 104 may be further configured to activate the biometric sensor to collect the biometric information of the vehicle user where allowed by law. The sensor data may be useful to not only locate the vehicle 102, but also identify the unauthorized vehicle user (e.g. the thief) by law enforcement agencies.

At operation 210, the computing platform 104 activates various wireless transceivers and communicates with any available external devices via the transceivers through multiple frequency bands. As discussed above, one or more vehicle communication systems may have been compromised by sophisticated thieves to prevent the vehicle 102 from communicating with the server 178. In one example, the TCU 170 operation may be compromised by hardware tampering and/or signal jammers. The vehicle 102 may be unable to directly communicate with the server 178 via the wireless network 172. However, the vehicle 102 may still have one or more remaining wireless communication capabilities enabled by one or more functioning wireless transceiver 132 in support of various wireless protocols. Utilizing the functioning wireless capabilities to communicate with external devices 128 may increase the chance for the vehicle 102 to be successfully identified and located by parties of interests (e.g. the manufacturer, law enforcement). There are a couple of ways for the computing platform 104 to communicate with the external device 128. For instance, the computing platform 104 may broadcast an unencrypted message via one or more functioning wireless transceivers 132 using various protocols (e.g. BLUETOOTH, UWB, Wi-Fi, NFC) regardless whether the external device 128 has been detected within the transmission range. Additionally, or alternatively, the computing platform 104 may search for and attempt to connect to any compatible external devices 128 within the transmission range of the wireless transceivers 132 before sending the message to the connected external device 128. Regardless of the specific protocol to transmit to the external device, the message may include various entries of information that may be used to identify and locate the vehicle 102. For instance, the message may include vehicle identification information such as the vehicle identification number (VIN), vehicle nameplate, model year, color or the like. The message may further include the current vehicle location as determined by the GNSS controller 124. The message may further include the sensor data collected at operation 208 such as the video, audio, and biometric data. The message may further include a fuel level of the vehicle 102 (e.g. battery level for EVs) which may be used to determine the vehicle range.

In addition to transmitting the message using the multiple frequency bands, the computing platform 104 may directly communicate with the unauthorized vehicle user to dissuade the user from continuing the unauthorized use.

At operation 212, the computing platform 104 generates a notice and outputs the notice via the speaker 118 and/or display 114. The notice may include a general message to persuade the user to stop the vehicle 102. Examples of the notice may include "This vehicle is detected stolen. You are being tracked!" and "Vehicle theft is a Felony! Stop now!" The notice may be repeated in a mandatory manner, i.e. the user is not allowed to mute or even reduce the volume of the audio notice; or turn off the video notice output via the display 114. User inputs to stop the notice may be disregarded by the computing platform 104. The mandatory output of the notice may also help the public and/or law enforcement agency to identify the stolen status of the vehicle. For instance, if the vehicle 102 is stopped by law enforcement, the officer may immediately realize the vehicle 102 is stolen upon noticing the video and/or audio notice. In some examples, the notice may be further customized based on various input such as the vehicle location. For instance, different jurisdictions (e.g. States) may have different penal standards for vehicle theft. The notice may be adjusted and modified based on the different penal standards. As an example, when the vehicle is being operated in jurisdiction A, the notice may include "Vehicle theft in State A may be punishable by up to 3 years in prison." As the vehicle 102 continues to be driven and enters jurisdiction B having a different penal standard, the notice may be modified to "Vehicle theft in State B may be punishable by up to 5 years in prison." or the like. As another example, if the vehicle is about to cross state lines, the vehicle 102 may advise the driver the offense will elevate to a federal charge with even greater penalties. Additionally, in cases that the vehicle 102 is provided with exterior speakers or displays, the computing platform 104 may further generate a notice to output via the exterior speakers and displays. It is noted that the notice output exteriorly may be different from those output in the vehicle cabin as the exterior notice is more directed to raising the public awareness about the stolen status of the vehicle 102. An example of the exterior notice may be "This vehicle is reported stolen. Call 911!"

In addition to the notice, at operation 214, the vehicle 102 may further perform body operations to facilitate the vehicle identification and mitigation of the situation. For instance, the BCM 186 of the vehicle 102 may lock the vehicle doors and trunk to prevent the unauthorized user from abandoning the vehicle until law enforcement agents has arrived. Additionally, or alternatively, the BCM 186 may operate the exterior lights and horn (e.g. flashing lights, honking the horn) of the vehicle at a predefined pattern to attract awareness from the public.

Additionally, at operation 216, the vehicle 102 further performs autonomous driving operations to mitigate the situation. As an example, the PCM 184 may impose a speed limit on the vehicle (e.g. 15 mph) to prevent the vehicle from causing a high speed pursuit. The ADC 182 may take over the driving control from the unauthorized user and autonomously drive to and park at a predefined location (e.g. side of the road, police station). Operations of the process 200 may be applied to various situations.

Figure 3:
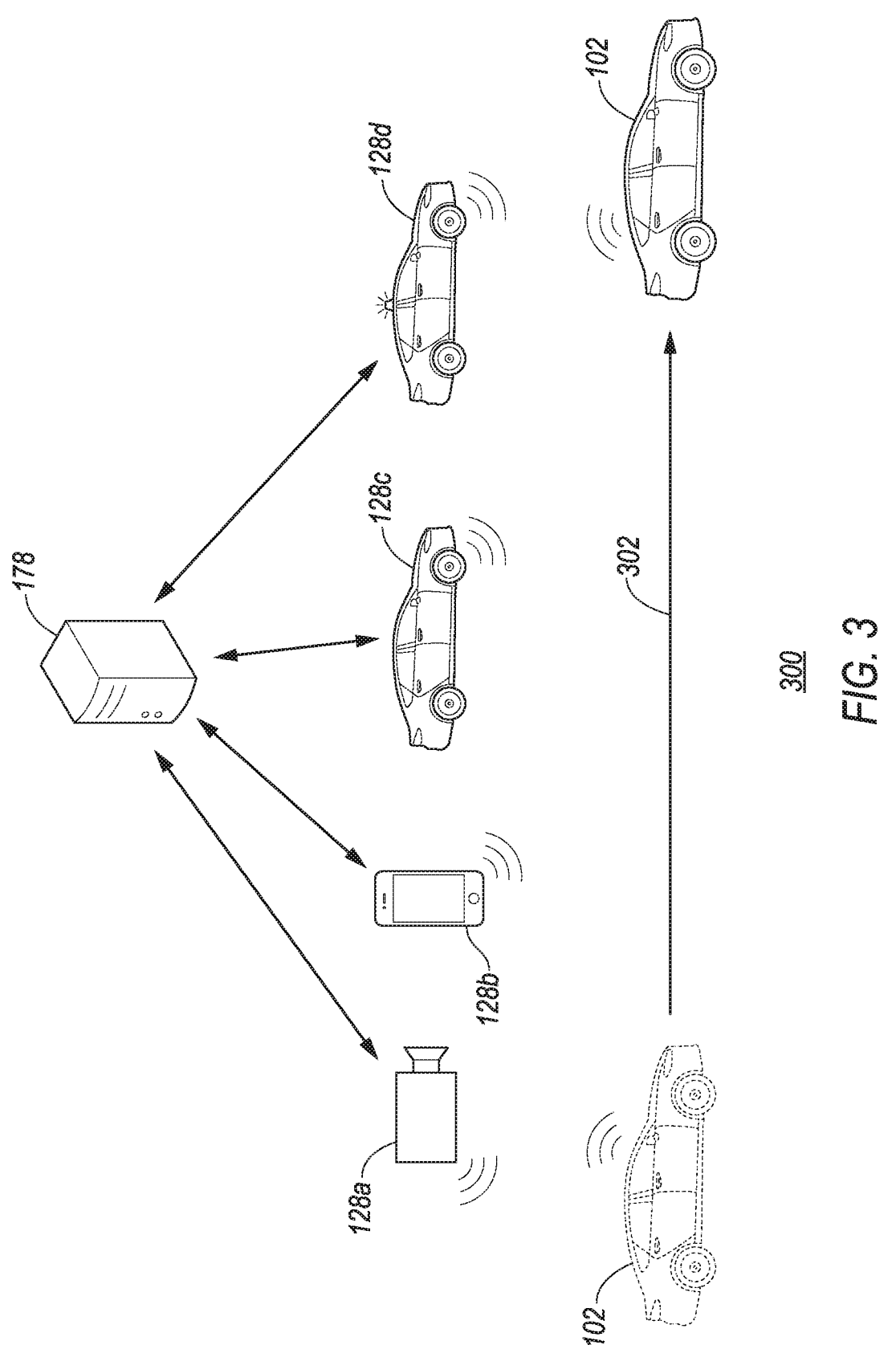
FIG. 3 illustrates an example schematic diagram of an example of the present disclosure.

Referring to FIG. 3, and example schematic diagram 300 of an embodiment of the present disclosure is illustrated. With continuing reference to FIGS. 1 and 2, in the present example, the vehicle 102 is flagged as stolen and the stolen vehicle service is activated. As the vehicle 102 traverses on the route 302, the computing platform 104 attempts to communicate with various external devices 128 associated with various entities via multiple frequency bands to increase the chance of success. For instance, the computing platform 104 may first establish a wireless communication with an infrastructure device 128*a* in support of the multiple frequency bands. As discussed above, the infrastructure device 128*a* may include a traffic camera, portable LPR, parking meter, traffic signal devices, fueling station or the like configured to support one or more wireless communication protocols of the multiple frequency band communications. The infrastructure device 128*a* may be further provided with sensors such as a camera to capture images/videos of the vehicle 102*a* responsive to receiving the message transmitted therefrom. The infrastructure device 128*a* may further report the message received from the vehicle and data captured by the onboard sensors to the server 178 to provide the useful information to identify and locate the stolen vehicle 102.

As the vehicle continues to traverse along the route 302, a mobile device 128*b* (e.g. a smart phone) associated with a third party entity may become within the wireless transmission range of the vehicle 102. The mobile device 128*b* may be subscribed to the stolen vehicle service in exchange for a reward provided by the system. Responsive to receiving the message transmitted from the vehicle 102, the mobile device 128*b* may report the message as well as useful information such as the location of the mobile device 128*b* to the server 178. Additionally, the mobile device 128*b* may be configured to output a message to the device user to explain the situation and ask the user to active the camera and capture images/videos of the stolen vehicle 102. For instance, responsive to receiving the signal transmission from the vehicle 102, the mobile device 128*b* may display a message such as "2023 blue color BRAND MODEL vehicle reported stolen is near you. Please consider capturing an image of the vehicle to help. Look for flashing headlights." or the like such that more helpful information may be provided to the server 178. As discussed above, the BCM 186 may operate vehicle body features such as flashing the headlights to attract the public awareness for easier identification.

Similarly, a fleet vehicle 128*c* operating as another external device may subsequently become within the wireless transmission range of the vehicle 102. The fleet vehicle 128*c* may be directly or indirectly associated with vehicle 102 as reported stolen. For instance, the fleet vehicle 128*c* may be associated with the same manufacturer or dealership as the vehicle 102. Additionally, or alternatively, the fleet vehicle 128*c* may be subscribed to the stolen vehicle service in exchange for a reward similar to the mobile device 128*b*. Responsive to receiving the message from the vehicle 102, the fleet vehicle 128*c* may report the message as well as the fleet vehicle information (e.g. location) to the server 178. If provided with a camera, the fleet vehicle 128*c* may automatically activate the camera to capture images/videos of the stolen vehicle 102 and upload the images/videos to the server 178 for processing. In some examples, both the stolen vehicle 102 and the fleet vehicle 128*c* may be provided with vehicle-to-vehicle (V2V) communication capabilities via wireless connections such as dedicated short-range communication (DSRC) and cellular vehicle-to-everything (CV2X). The V2V communication may be a part of the multiple frequency communication bands. Additionally, since V2V communications may include accurate information with regard to the relative locations of the vehicles, the fleet vehicle 128*c* may use the relative location of the vehicle 102 to direct the camera to capture in images/videos.

With the information reported to the server 178 by multiple external devices 128, a law enforcement entity may locate the stolen vehicle 102 and dispatch an agent correspondingly. As illustrated in the example in FIG. 3, a law enforcement device 128*d* may be dispatched to the current or predicted vehicle location to engage with the stolen vehicle 102. For instance, the law enforcement device 128*d* may be a police vehicle provided with capabilities to communicate with the stolen vehicle 102 via the multiple frequency bands. As the law enforcement device 128*d* approaches and enters the transmission range of the stolen vehicle 102, the law enforcement device 128*d* may also receive the wireless message such that the stolen vehicle 102 may be readily identified. Alternatively, in cases that the law enforcement device 128*d* is not provided with the compatible wireless transmission capability and cannot directly receive the message from stolen vehicle 102, the officer may still be able to manually identify the stolen vehicle using the information provided by the server as well as the vehicle operations (e.g., flashing lights, audio/video notices) attracting public awareness.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle, comprising:
   a transceiver configured to support multiple frequency bands;
   a display; and
   a controller programmed to, responsive to detecting the vehicle is stolen,
       generate a message including a location of the vehicle, an identification of the vehicle, and a vehicle fuel level or charge level,
       transmit the message to one or more external devices via the transceiver using the multiple frequency bands;
       generate a first notice; and
       output the first notice via the display;
       disregard one or more user inputs intended to turn off the first notice.

2. The vehicle of claim 1, further comprising a camera, wherein the controller is further programmed to, responsive to detecting the vehicle is stolen:
   capture a facial image of a vehicle user using the camera, and
   include the facial image in the message.

3. The vehicle of claim 1, wherein the controller is further programmed to:
   generate the first notice using the location of the vehicle;
   responsive to detecting a current vehicle route being predicted to enter a new geographical area, output a second notice different from the first notice; and
   responsive to detecting the vehicle has entered the new geographical area, modify the first notice using the location of the vehicle reflecting the new geographical area.

4. The vehicle of claim 1, further comprising an interior speaker, wherein the controller is further programmed to:
   output the first notice via the interior speaker; and
   disregard a manual input to turn off the interior speaker or the display.

5. The vehicle of claim 4, further comprising an exterior speaker outside the vehicle, wherein the controller is further programmed to:
   generate a second notice different from the first notice in content; and
   output the second notice via the exterior speaker.

6. The vehicle of claim 1, wherein the controller is further programmed to:
   responsive to detecting the vehicle is stolen, imposing a limitation on a motion maneuver of the vehicle and lock doors of vehicle.

7. The vehicle of claim 1, wherein the controller is further programmed to:
   detect the vehicle is stolen by detecting at least one or more frequency bands supported by the transceiver no longer functions while at least another frequency band supported by the transceiver continues to function.

8. The vehicle of claim 1, wherein the controller is further programmed to:
   responsive to detecting the vehicle is stolen, flash one or more vehicle lights and honk a horn of the vehicle.

9. The vehicle of claim 1, wherein the multiple frequency bands support at least two of communication protocols: cellular, BLUETOOTH, ultra-wideband, Wi-Fi, radio-frequency identification, or dedicated short-range communication.

10. The vehicle of claim 1, wherein the one or more external devices dude: an infrastructure device, a fleet vehicle, and a mobile phone.

11. A method for a vehicle, comprising:
   responsive to detecting a vehicle is being operated by an unauthorized user, generating, via one or more controllers, a message including a vehicle identification;
   transmitting, via one or more transceivers, the message to one or more external devices via a plurality of wireless frequency bands;
   generating, via the one or more controllers, a first notice; and
   outputting, via a display, the first notice by ignoring a user input intended to turn off the display;
   outputting, via an interior speaker, the first notice;
   generating, via the one or more controllers, a second notice different from the first notice;
   outputting, via an exterior speaker, the second notice; and
   disregarding, via the one or more controllers, one or more user inputs intended to turn off the first or second notice.

12. The method of claim 11, wherein the message is generated using a vehicle location, the method further comprising:
   responsive to detecting a current vehicle route being predicted to enter a new jurisdiction, output a second notice different from the first notice;
   responsive to detecting the vehicle has entered the new jurisdiction, modifying, via the one or more controllers, the first notice using the vehicle location to reflect the new jurisdiction; and
   outputting, via the display, the first notice as modified.

13. The method of claim 11, further comprising:
   capturing, via a camera, an image; and
   transmitting, via the one or more transceivers, the message including the image to the one or more external devices.

14. The method of claim 11, further comprising:
   autonomously operating, via the one or more controllers, the vehicle to a predefined location; and
   locking, via the one or more controllers, doors of the vehicle.

15. The method of claim 11, further comprising: continuously, via the one or more controllers, flashing one or more exterior vehicle lights.

16. A non-transitory computer-readable medium, comprising instructions, when executed by one or more controllers of a vehicle, cause the vehicle to:
   responsive to detecting a vehicle is stolen, capture an image of a vehicle user;
   generate a message including a vehicle identification, a vehicle location, and the image;
   transmit the message to one or more external devices via multiple frequency bands;
   generate a first notice based on the vehicle location;
   output the first notice via an interior display;
   generate a second notice different from the first notice; and
   output the second notice via an exterior display;
   disregard one or more user inputs intended to turn off the first or second notice;
   responsive to detecting the vehicle exiting a first area and entering a second area, regenerate the first notice based on the vehicle location reflecting the second area.

17. The non-transitory computer-readable medium of claim 16, further comprising instructions, when executed by one or more controllers of a vehicle, cause the vehicle to:

detect the vehicle is stolen by being unable to connect a cellular network at a location that is known to be covered by the cellular network.

\* \* \* \* \*